United States Patent Office 2,831,392
Patented Apr. 22, 1958

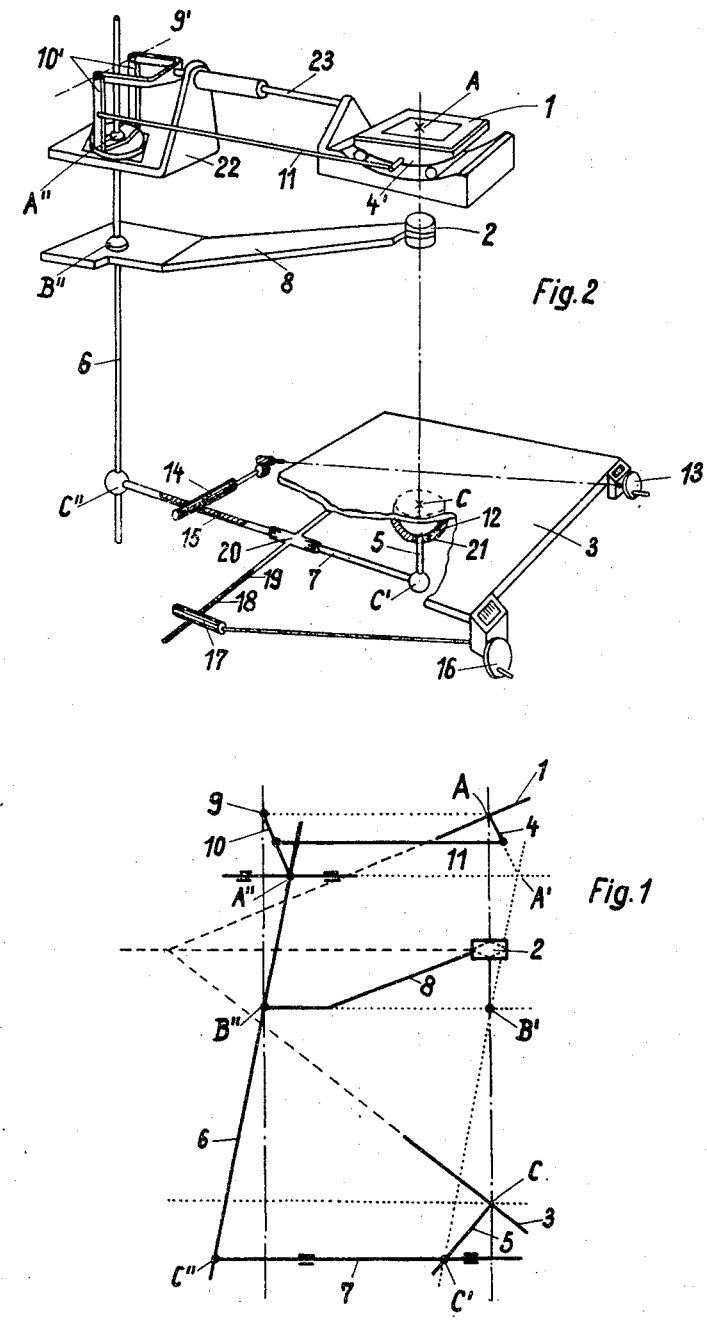

2,831,392

PROJECTION STAGE FOR AUTOMATIC RECTIFICATION INSTRUMENTS

Walther Bauersfeld, Heidenheim (Brenz), Wurttemberg, and Heinrich Sonnberger, Heidenheim (Brenz), Germany, assignors to Carl Zeiss, Heidenheim (Brenz), Wurttemberg, Germany Application August 26, 1953, Serial No. 395,433
(Filed under Rule 47(a) and 35 U. S. C. 116)

Claims priority, application Germany March 17, 1953

8 Claims. (Cl. 88—24)

The invention concerns a projection stage for automatic rectification instruments, namely the mounting of such a stage as well as a favorable transmission of the motion of this stage to a Carpentier inverter connected therewith. To assure a sharp imaging of all points of an image plane into the projection plane of said stage, as is known, the Scheimpflug condition must be fulfilled, i. e. image plane and projection plane must intersect in the principal plane of the objective. This is attained in known instruments in that the image plane, the objective with its principal plane and the projection plane can be tilted around parallel axis and that the tilting is realized by levers which are connected with the image, the objective, and the projection stage, so that their assumed extensions intersect the said axes of rotation and these intersections are situated on a straight line. The tilting of the levers is controlled, in order to meet the said Scheimpflug condition, by a straightedge of the said Carpentier inverter on which the levers are mounted in such a way that their mounting points, when tilting the planes, move in parallel fixed planes, whereby these motion planes must always have the same constant distance from the axes of rotation of the image plane, principal plane of the objective, and projection plane. For reasons of construction the straightedge of the inverter has been displaced parallel out of the instrument, and the tilting motions have been transmitted from the levers on to the straightedge by means of rods. Hitherto especially the tilting of the projection stage was effected by means of two parallel rods which were connected with the tilting lever of the stage on the one hand and with the straightedge of the inverter on the other, similar to parallelogram rods. This however had the disadvantage that when the stage was turned by an angle, the distance of the parallelogram rods connecting the tilting lever and the straightedge changed, so that the condition that the point of engagement of the tilting lever should move in the said fixed plane was not fulfilled. The parallelogram rods were therefore not directly used for controlling the inverter, but their movement was transmitted onto a lever parallel to the tilting lever, of the projection stage. The stage was mounted in a Cardan and handwheels, which effected the stage tilting, engaged the Cardan axes.

It is an object of the invention to gife a mechanism to fulfil the Scheimpflug condition in two directions perpendicular to one another.

It is further an object of the invention to arrange the projection stage so as to be inclinable in the two directions and it is an object of the invention to connect the projection stage and said mechanism in simple manner.

Now in accordance with the invention movement of the compound slide and the therewith connected stage can result through displacement organs, for example handwheels engaging its slides.

An example of the object of the invention is represented in the drawing, namely there is shown in Fig. 1 a schematic representation of the rod steering for fulfilling the Scheimpflug condition, and in Fig. 2 a perspective view of the stage mounting and steering.

In Fig. 1 an image point A of an image plane 1 is sharply imaged by an objective 2 in a point C of a projection stage 3. The image plane 1 and the projection stage 3 have tilting levers 4 and 5 mounted at right angles on them. The tilting lever 5 and a straightedge 6 of a Carpentier transformer are fastened to a slide 7 of a compound slide 7, 19 (Fig. 2) with ball joints at the points C' and C'', in such fashion that they are slideable relative to the slide 7 along their axis. The stage 3 therefore, in displacing the slide 7 along its axis and also by a displacement perpendicular to the plane of the drawing, can turn about the point C. Likewise the straightedge 6 can turn about the fixed point B'' in which it is fastened with a ball joint. The objective 2 is firmly connected by a rod 8 with the joint in B'' and retains its position when turning the stage 3 and the image plane 1. The movement of the slide 7 causes over the straightedge 6 the movement of a lever 10 turnable about the point 9 which lever 10 at point A'' is attached on the straightedge 6 by means of a ball joint displaceable along its axis. The movement of the lever 10 is transferred through a rod 11 to the tilting lever 4, which on its part tilts the image plane 1. The perpendicular distance of the points A and C from the directions of movement of the points A'' and C'' or C' is always equal to the distance of the principal plane of the objective 2 from the points B' or B''. The points A', B', and C' correspond in reference to the Carpentier steering to the points A'', B'', and C''. Since these always lie on a straight line, the Scheimpflug condition is fulfilled i. e. in all possible turning positions of the stage and of the image planes these always intersect in the principal plane of the objective 2.

Fig. 2 shows the perspective view of the steering according to Fig. 1, whereby the reference symbols are taken over from Fig. 1. In Fig. 2 the mounting of the stage 3 in a hemispherical bowl is apparent. Its center point, which at the same time is turning point of the stage, lies in C. The tilting lever 5 grips through an opening 21 of the bowl 12. The tilting is effected in one case through a handwheel 13, which transfers its turning to a cogwheel 14 which engages teeth 15 of the slide 7, and displaces this along its axis. The tilting movement in perpendicular direction thereto is effected through a further handwheel 16, whose turning movement is transferred to a cogwheel 17, and which engages the teeth 18 of the second slide 19 of the compound slide and displaces this along its axis. The slide 7 is mounted displaceable in a sleeve 20 of the slide 19, so that the movement of the slide 19 effects a cross displacement of the slide 7, and a longitudinal displacement of the slide 7, lets the slide 19 in its position.

The mode of action of the instrument is the following: Turning the handwheel 13 effects across the cogwheel 14 and the teeth 15 of the slide 7 a displacement of this slide along its axis. Thereby, for one, the stage 3 hooked up to the slide 7 turns about the point C, and, for the other, the straightedge 6 hooked up to the other end of the slide 7 turns about the point B''. Thereby the parallel levers 10' hooked up to the straightedge 6 turn about the axis 9' and displace the rod 11, which for its part turns the image plane 1 across a cradle 4' corresponding to the lever 4. Turning of the handwheel 16 effects across the cogwheel 17 and the teeth 18 of the slide 19 a displacement of this slide along its axis. The sleeve 20 thereby carries the slide 7 along and displaces this parallel to itself. The stage 3 and the straightedge 6 now execute turning movements about the points C and B'', which stand perpendicular to the previously described direction of movement. The straightedge 6 now turns a lever 22 about a rod 23. Thereby the image plane 1 tilts in the same direction as the stage 3.

We claim:
1. In an automatic rectification instrument having a projection stage, an objective and a photograph, wherein the projection stage and photograph each are turnable around a fixed point, a straightedge turnable around a fixed point, means to turn said straightedge, means connecting one end of the straightedge with the photograph and the other end of the straightedge with the projection stage, so as to turn the photograph and the projection stage together but in opposite direction in turning said straightedge, so that the plane of the photograph and the plane of the projection stage intersect always in the plane of the objective, said means connecting the one end of the straightedge with the projection stage consisting in a lever fixedly connected with the projection stage and a rod displaceable axially and in perpendicular direction thereto in a fixed plane as well as links engaging said rod with said lever and said straightedge.

2. Automatic rectification instrument as in claim 1 characterized in that said projection stage has fixed therewith a hemispherical body turnable in a firmly disposed hemispherical bowl in the instrument.

3. Automatic rectification instrument as in claim 1 characterized in that the joints connecting the said lever and said straightedge with said rod are ball joints with a bore to engage said lever and said straightedge.

4. Automatic rectification instrument as in claim 1, characterized in that the rod connecting said lever and said straightedge is a slide of a compound slide and that the slides of said compound slide have teeth and that cogwheels and handwheels are provided, said cogwheels engaging said teeth and said cogwheels being turnable by said handwheels to displace said slides.

5. In an automatic rectification instrument having a projection stage, an objective and a photograph, wherein the projection stage and photograph each are turnable around a fixed point, a straightedge turnable around a fixed point, means to turn said straightedge, means connecting one end of the straightedge with the photograph and the other end of the straightedge with the projection stage, so as to turn the photograph and the projection stage together but in opposite direction in turning said straightedge, so that the plane of the photograph and the plane of the projection stage intersect always in the plane of the objective.

6. In an automatic rectification instrument having a projection stage, an objective and a photograph, wherein the projection stage and photograph each are turnable around a fixed point, a straightedge turnable around a fixed point means to turn said straightedge, means connecting one end of the straightedge with the photograph and the other end of the straightedge with the projection stage, so as to turn the photograph and the projection stage together but in opposite direction in turning said straightedge, so that the plane of the photograph and the plane of the projection stage intersect always in the plane of the objective, said means connecting the one end of the straightedge with the photograph consisting in two levers one of them being fixedly connected to said photograph and the other being turnable around a fixed point and being linked to said straightedge, a rod connecting both levers to effect equal movements of said levers.

7. An automatic rectification instrument having a projection stage, an objective and a light transmitting photograph holder, an aerial photograph lying on said holder said objective imaging said photograph on said projection stage a rod and a ball pivot arranged in said instrument, said rod being turnable in said ball pivot, a hemispherical bowl fixedly arranged in the instrument, a hemispherical body fixedly connected to said projection stage and arranged in said hemispherical bowl so as to slide in said bowl and to turn the projection stage around the center of said bowl, a bore in said bowl and a rod arranged in said bore with play, said rod being fixedly connected to said hemispherical body to turn said body and said projection stage, a first guide and a slide shiftable in axial direction in said guide, one end of said slide being connected to said rod connected with said hemispherical body and the other end being connected with one end of said rod turnable in said ball pivot, means to move said slide axially, so that this slide inclines the projection stage in one direction and turns the rod connected therewith in said ball pivot in a corresponding first direction, said guide being shiftable in a direction perpendicular to the axial moving direction of said slide, means to shift said guide in this direction, so that this guide shifts said slide parallel to itself and said slide inclines the projection stage in a direction perpendicular to said one direction and turns said rod connected therewith in said ball pivot in a direction perpendicular to said corresponding first direction, a second guide forming part of a circle, said photograph holder having a corresponding circle part, said circle part lying in said second guide to incline the photograph holder in one direction in sliding in said guide, a rod being connected to said photograph holder and said rod turnable in said ball pivot so as to incline the photograph holder in said one direction if said rod turnable in said ball pivot turns in said corresponding first direction, a shaft arranged parallel to said rod connecting said photograph holder and said rod turnable in said ball pivot, said shaft being turnable around its axis, said photograph holder being connected to said shaft to incline in a direction perpendicular to that one direction determined by said circular guide in turning said shaft, means connecting said turnable shaft and said rod turnable in said ball pivot so as to turn said photograph holder around said shaft when said rod turnable in said ball pivot turns in a direction perpendicular to said corresponding first direction, said objective being fixedly arranged in the instrument, said ball point being arranged between the points of connection of the rod connected to said photograph holder and the slide arranged in said first guide so that the plane of the projection stage and the plane of the photograph always intersect in the plane of the objective in turning the projection stage and the photograph holder in any direction.

8. An automatic rectification instrument as in claim 7, said means moving said slide and said first guide including teeth arranged on the one hand on said slide lying in said first guide and on the other hand on said first guide, a first gear engaging the teeth on said slide and shifting said slide axially in turning, a second gear engaging the teeth of said first guide and shifting said guide parallel to itself in turning, a first hand-wheel and a first flexible shaft between said hand-wheel and said first gear, a second handwheel and a second flexible shaft between said second handwheel and said second gear, so that in turning one of the handwheels the therewith connected gear turns, said handwheels being connected to said projection stage.

References Cited in the file of this patent
UNITED STATES PATENTS

| 1,910,425 | Cahill | May 23, 1933 |

FOREIGN PATENTS

| 448,166 | Germany | Aug. 12, 1927 |
| 624,862 | Germany | Jan. 30, 1936 |
| 718,046 | Germany | Mar. 4, 1942 |
| 876,195 | Germany | May 11, 1953 |